United States Patent
Hongou (10) Patent No.: US 6,323,973 B1
(45) Date of Patent: Nov. 27, 2001

(54) APPARATUS FOR OPTICAL TRANSMISSION AND METHOD THEREFOR

(75) Inventor: Yoshiyuki Hongou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/129,130

(22) Filed: Aug. 4, 1998

(30) Foreign Application Priority Data

Feb. 26, 1998 (JP) .................................................. 10-045595

(51) Int. Cl.$^7$ .................................................. H04B 10/08
(52) U.S. Cl. .................. 359/110; 359/177; 359/187; 359/180
(58) Field of Search .................. 359/110, 177, 359/187, 180

(56) References Cited

U.S. PATENT DOCUMENTS

| | | | |
|---|---|---|---|
| 5,331,449 | * 7/1994 | Huber et al. | 359/125 |
| 5,432,874 | * 7/1995 | Muraguchi | 385/24 |
| 5,491,572 | * 2/1996 | Ohara | 359/110 |
| 5,615,033 | * 3/1997 | Yoshida et al. | 359/110 |
| 5,790,286 | * 8/1998 | Bae | 359/110 |
| 5,920,414 | * 7/1999 | Miyachi et al. | 359/133 |
| 6,040,931 | * 3/2000 | Miyazaki et al. | 359/110 |
| 6,134,034 | * 10/2000 | Terahara | 359/124 |
| 6,204,945 | * 3/2001 | Iwata et al. | 359/124 |
| 6,211,981 | * 4/2001 | Watanabe | 359/133 |

FOREIGN PATENT DOCUMENTS

| | | |
|---|---|---|
| 60-101503 | 6/1985 | (JP) . |
| 5-291667 | 11/1993 | (JP) . |
| 5-291669 | 11/1993 | (JP) . |
| 6-244805 | 9/1994 | (JP) . |

* cited by examiner

*Primary Examiner*—Leslie Pascal
*Assistant Examiner*—Hanh Phan
(74) *Attorney, Agent, or Firm*—Staas & Halsey LLP

(57) ABSTRACT

The invention provides an optical transmission apparatus and method which can accurately detect the opening of an output port or fracture of an optical fiber, and then, for each output port, restrain the release to the surroundings of high output light signals. With the optical transmission apparatus of the invention, a rising signal sent from a transmission path connected to an output port is detected by an abnormality judgment device which judges if an abnormality has occurred in the transmission path, based on the detected rising signal. If the ocurrence of an abnormality is judged, a light shut-off device provided between a light signal generating device for generating amplified light signals and the output port is operated to shut off the transmission of light signals from the light signal generating device to the output port. As a result, the release to the surroundings of high output light signals is prevented without limiting the amplifying operation of the light signal generating device.

8 Claims, 11 Drawing Sheets

APPARATUS FOR OPTICAL TRANSMISSION AND METHOD THEREFOR

BACKGROUND OF THE INVENTION

1. Field of the Invention

The present invention relates to an apparatus for optical transmission and a method therefor, for transmitting an amplified light signal via a transmission path. In particular the invention relates to an apparatus for optical transmission and a method therefor, where release to the surroundings of a high output light signal is prevented in the case where a connector for connecting an optical fiber becomes disconnected or the optical fiber becomes damaged.

2. Description of the Related Art

For example, with image distribution systems such as optical CATV systems, in order to provide a service to several thousand subscribers with a single system, it is required to branch a high output light signal of a high optical power level into a plurality to transmit to the respective subscribers. To obtain such a high output light signal, in general an optical amplifier or the like is used.

With a system for handling such a high output light signal, then for example, in a case such as where a connector connecting between an output port outputting a light signal and a transmission path becomes disconnected, there is the possibility of the high output light signal being released to the surroundings. To prevent this release of the high output light signal, conventionally countermeasures are adopted such as having a construction where for example the Fresnel reflection light generated at the end face of the opened output port due to disconnection of the connector is detected, and the amplifying operation of the optical amplifier is controlled to stop or attenuate the light output so that the high output light signal is not released to the surroundings.

As a conventional apparatus incorporating such a function to control the operation of an optical amplifier at the time of detecting the occurrence of an abnormality, to prevent the release to the surroundings of the high output light signal, there is for example the disclosures of Japanese Unexamined Patent Publications Nos. 60-101503, 5-291667, 5-291669, and 6/244805.

However, with systems such as with an image distribution system wherein light signals from a single optical amplifier are multiply branched and used, then for example, at the time of enlargement of the circuit, the terminator attached to the unused port is removed, and the additional circuit connected. In such a case, with the conventional technique, the reflected light at the end face of the output port which has been opened by removing the terminator is detected, and the amplifying operation of the optical amplifier is controlled to stop or attenuate the light output. Consequently, there is the problem that all of the circuits which receive the light signals from the amplifier are shut-off (normal light signal output is shut-off).

In order to solve the abovementioned problem at the time of circuit enlargement, then for example, a measure has been previously adopted which adjusts the detection level of the reflection light so that if only one or two ports are opened, the amplifying operation of the optical amplifier is not limited. If this measure is adopted however, there is the problem that in the case where only one or two ports are opened, high output light signals are released from the opened port.

Furthermore, in the case of the conventional technique where the reflected light is detected, to thereby judge the occurrence of an abnormality in the transmission path, then for example, when an optical fiber is damaged close to a subscriber, the reflected light is attenuated due to the loss between the output port and the damage point, and hence detection of the reflected light becomes difficult. On the other hand, when an optical fiber is damaged close to an output port, detection of the reflected light becomes difficult depending on how this is cut (for example when the breakage is at an incline etc.). Due to this situation where the necessary detection function for the reflected light does not operate normally, a high output light signal is released from the damaged point.

SUMMARY OF THE INVENTION

The present invention addresses the above problems, with the object of providing an apparatus for optical transmission which can accurately detect the opening of an output port or fracture of an optical fiber, or the like, and then corresponding to the output port, restrain release to the surroundings of high output light signals.

Figure 1:
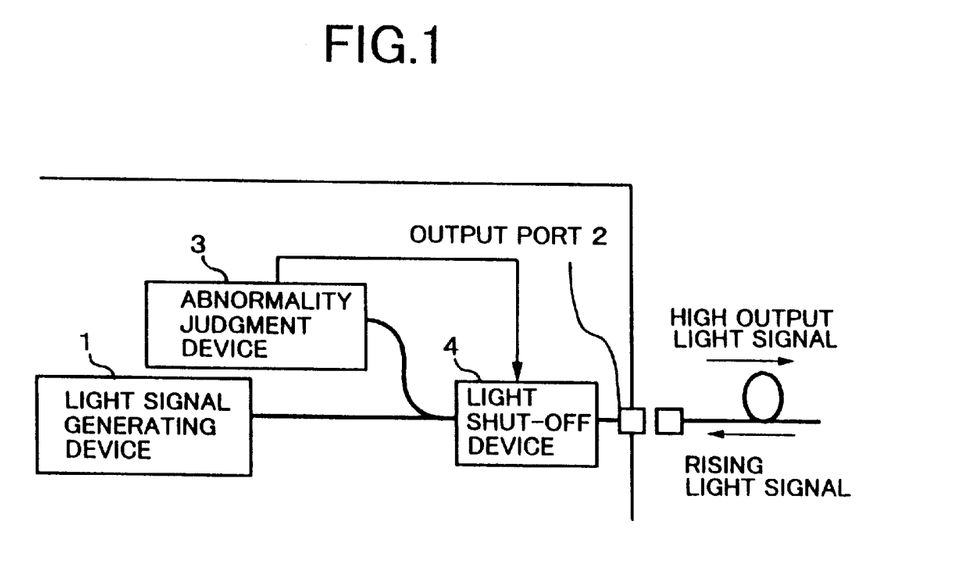
FIG. 1 is a block diagram illustrating a basic construction of the present invention for the case where the rising signal is a light signal.

Accordingly with the present invention, as shown in FIG. 1, with an optical transmission apparatus which includes a light signal generating device 1 for generating an amplified light signal, and an output port 2 connected to an end of a transmission path, and which sends the light signal via the output port 2 to the transmission path, the construction comprises; an abnormality judgment device 3 for judging if an abnormality has occurred in the transmission path connected to the output port 2, based on a rising signal which passes through the output port 2 and is transmitted towards the light signal generating device 1, and a light shut-off device 4 for shutting off a light signal transmitted between the light signal generating device 1 and the output port 2 when an abnormality in the transmission path is judged by the abnormality judgment device 3.

With such a construction, if an abnormality such as disconnection of a connector or fracture of the optical fiber occurs in a transmission path with one end connected to the output port 2, the condition of the rising signal transmitted from the transmission path via the output port 2 towards the light signal generating device 1 changes. For example, in the case where the light signal transmitted from the other end of the transmission path is used as the rising signal, then a rising signal detected by the abnormality judgment device 3 at normal times is not detected when an abnormality occurs. Furthermore for example, in the case where the reflected light from the open end is used as the rising signal, then a rising signal which is not detected by the abnormality judgment device 3 at normal times is detected when an abnormality occurs. When, based on this change in the rising signal, the occurrence of an abnormality in the transmission path is judged by the abnormality judgment device 3, then the amplified high output light signal transmitted from the light signal generating device 1 to the output port 2 is shut-off by the light shut-off device 4.

Consequently, the release to the surroundings of high output light signals from an open end or from a damaged point can be prevented, without limiting the operation of the light signal generating device.

Figure 2:
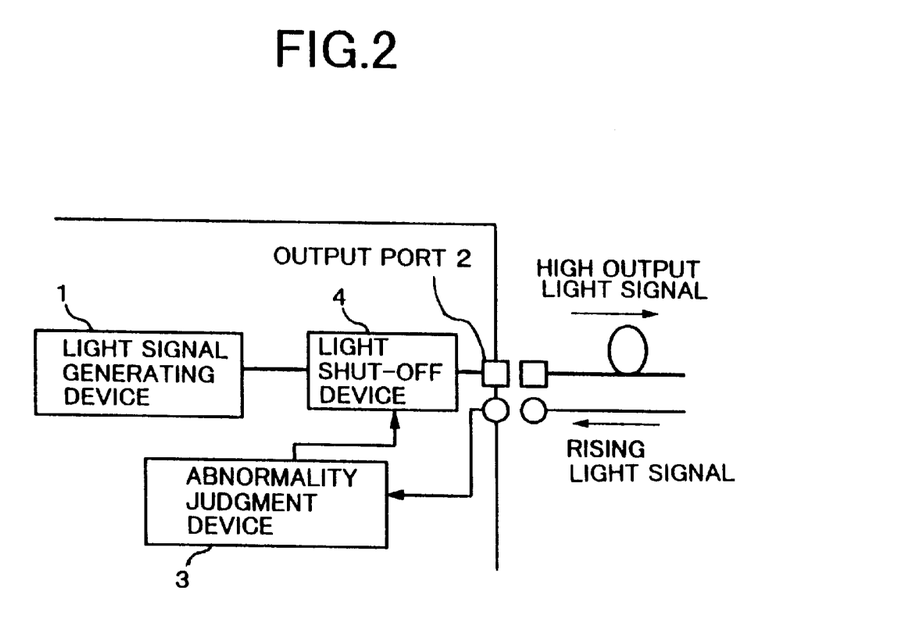
FIG. 2 is a block diagram illustrating a basic construction of the present invention for the case where the rising signal is an electric signal.

In FIG. 1, the construction is shown where the abnormality judgment device 3 detects a rising signal on the light signal generating device 1 side of the light shut-off device 4. However the basic construction of the present invention may be such that the rising signal is detected on the output port 2 side of the light shut-off device 4. Moreover, the construction is shown where the light signal is used as the rising signal. However, as shown in FIG. 2, an electric signal transmitted from the other end of the transmission path may be used as the rising signal.

In the abovementioned optical transmission apparatus the construction may be such that a branching device for branching the light signal from the light signal generating device 1 into a plurality of light signals is included, and the output ports 2 are multiply provided corresponding to the respective branch ports of the branching device, the abnormality judgment device 3 judges if an abnormality has occurred in the transmission path connected to the respective output ports 2 based on respective rising signals passing through the respective output ports 2, and the light shut-off device 4 shuts off light signals transmitted between the corresponding output ports 2 and the branch ports only with respect to the transmission path judged to be abnormal by the abnormality judgment device 3.

With such a construction, the condition of the transmission paths is judged by the abnormality judgment device 3 for each of the plurality of output ports 2. If the occurrence of an abnormality in a transmission path is judged, then the light signal sent from the light signal generating device 1 via the branching device is shut-off by the light shut-off device 4 only for the output port 2 connected to that transmission path.

Consequently, transmission of the light signal from the output ports connected to the normal transmission paths is maintained. Therefore at the time of occurrence of an abnormality or at the time of circuit enlargement, all the transmission paths receiving transmission of the light signals from the light signal generating device are not shut-off, as heretofore. Furthermore, fracture of an optical fiber can be reliably detected by judging the occurrence of an abnormality in the circuit, based on the rising signal. Hence the apparatus has improved safety.

Moreover, for the specific construction of the abnormality judgment device 3, this may involve providing for each of the respective output ports, a rising signal detection section for detecting the rising signal, and a judgment section for judging if an abnormality has occurred in the transmission path connected to the output port, based on comparative results between the rising signal detected by the rising signal detection section and a previously set reference signal.

Furthermore, the respective rising signals may include discrimination information corresponding to the respective output ports 2, and the abnormality judgment device 3 may have a discrimination information recognition section for recognizing the discrimination information included in the rising signals detected by the rising signal detection section, and whether or not an abnormality has occurred in the transmission path is judged by the judgment section with respect to the output port corresponding to the discrimination information recognized by the discrimination information recognition section. In addition, the abnormality judgment device 3 may incorporate a rising signal detection section for batch detection of the respective rising signals which have passed through the respective output ports.

In this way, by having the rising signal include discrimination information, and the abnormality judgment device 3 recognize the rising signal discrimination information to thereby judge the condition of the transmission path, then even at times where the signal detected by the rising signal detection section includes noise or the like, the required rising signal can be accurately detected to judge the condition of the transmission path. In addition, since the rising signal includes discrimination information, then the batch detection of the respective rising signals in the abnormality judgment device 3 is also possible.

With the abovementioned optical transmission apparatus, the rising signal detection section may detect the rising signal on the light signal generating device 1 side of the light shut-off device 4, and the light shut-off device 4 may include a shut-off release section for releasing the shut-off condition in response to a reset signal from outside.

With such a construction, then with the light shut-off device 4 which has attained a shut-off condition due to the occurrence of an abnormality in the transmission path, the shut-off condition is released by the transmission of a reset signal from outside, to the shut-off release section. In this way, an improvement in the convenience of the optical transmission apparatus can be achieved.

Moreover, the rising signal detection section may detect the rising signal on the light signal generating device 1 side of the light shut-off device 4, and the light shut-off device 4 may include a shut-off release section for periodically releasing a shut-off condition simultaneous with a start of this shut-off condition.

With such a construction, the light shut-off device 4 attains the shut-off condition due to an abnormality occurring in the transmission path, and the shut-off release section is operated so that the shut-off condition is periodically released. Furthermore, when the abnormality in the transmission path has been cancelled so that the rising signal returns to the normal condition, the rising signal is sent to the abnormality judgment device 3 in the instant that the shut-off condition of the light shut-off device 4 is released, and a normal condition of the transmission path is judged, thereby automatically releasing the shut-off condition of the light shut-off device 4. In this way, an improvement in the convenience of the optical transmission apparatus can be achieved.

Alternatively, the rising signal detection section may detect the rising signal on the output port side of the light shut-off device 4.

With such a construction, then also while the light shut-off device 4 is shut-off at the time of an abnormality occurring in the transmission path, the rising signal detection section is in a condition where it can detect a rising signal. Hence, if the transmission path returns to the normal condition, the shut-off condition of the light shut-off device 4 is automatically released. Consequently, an improvement in the convenience of the optical transmission apparatus can be realized, with a simple construction.

Furthermore, an optical transmission method of the present invention wherein an amplified light signal generated by a light signal generating device is sent to a transmission path via an output port connected to one end of the transmission path, comprises; a step for judging if an abnormality has occurred in the transmission path connected to the output port, based on a rising signal which has passed through the output port and transmitted towards the light signal generating device, and a step for shutting off the light signal transmitted between the light signal generating device and the output port, when an abnormality in the transmission path is judged.

With such a method, the release to the surroundings of high output light signals from an open end or from a damaged point can be prevented, without limiting the operation of the light signal generating device.

Other objects, features and advantages of the present invention will become apparent from the following description of the embodiments given in conjunction with the appended drawings.

DESCRIPTION OF THE PREFERRED EMBODIMENTS

As follows is a description of embodiments of the present invention with reference to the drawings.

Here, for example, the case is considered where the present invention is applied to an image distribution system such as an optical CATV.

At first, an outline of a typical image distribution system will be described.

Figure 3:
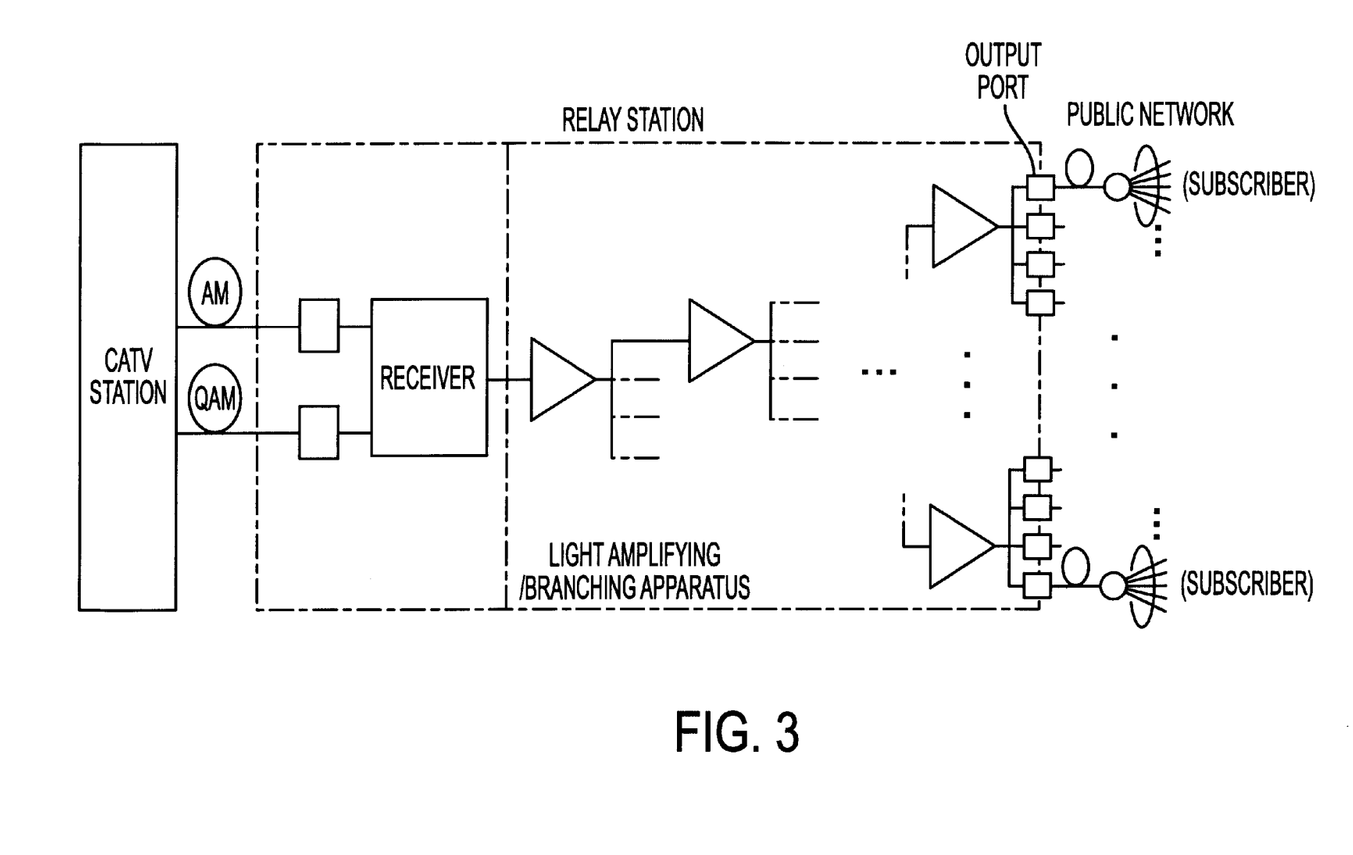
FIG. 3 is a diagram illustrating an outline construction of a typical image distribution system.

FIG. 3 shows an example of a construction for where a CATV station which produces audio or image information, and respective subscribers, communicate information in both directions via a public network. With this image distribution system, audio and image information or the like, is transmitted from a CATV station to a relay station by means of, for example, light signals which have been modulated by an AM system and light signals which have been modulated by a QAM system. The relay station receives the respective light signals from the CATV station with a receiver and then multiplexes these, after which they are subjected to amplification and branching repetitively by means of a light amplifying/branching apparatuses arranged in multi-stages, so that high output light signal are sent from a plurality of output ports to the public network. The light signals sent to respective public circuits are further multiply branched along the way, and then distributed out to the respective subscribers. One relay station has for example around 256~512 output ports. The power level of the light signals output from the respective output ports are set for example to a light output level of class 3A level, so as to maintain a sufficient reception level for the subscribers. With such an image distribution system, circuits of a number corresponding to the number of subscribers are connected to the output ports of the relay station, and the output ports which are not yet used are fitted with terminators or the like so that high output light signals are not released to the surroundings.

With the following embodiment, the abovementioned problems such as at the time of enlargement of the circuit or at the time of fracture of an optical fiber are overcome by applying the optical transmission apparatus of the present invention to the light amplifying/branching apparatuses inside the relay station in the abovementioned image distribution system.

Figure 4:
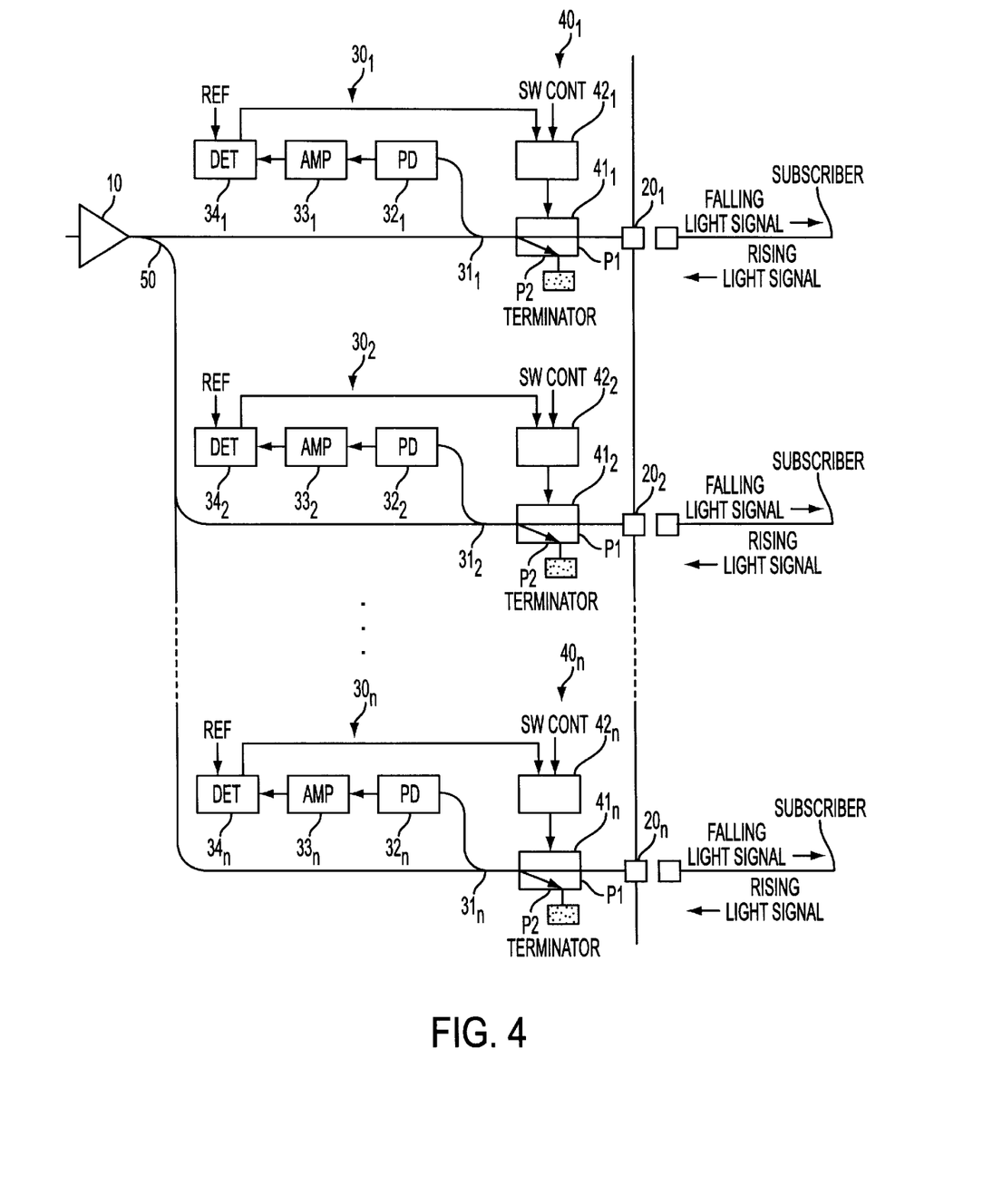
FIG. 4 is a block diagram illustrating the construction of a first embodiment of the present invention.

FIG. 4 is a block diagram illustrating the construction of a light amplifying/branching apparatus of a first embodiment. This construction, shows the construction of one light amplifying/branching apparatus provided at the last stage of the relay station.

In FIG. 4, the light amplifying/branching apparatus comprises; a light amplifier 10 as a light signal generating device for amplifying the input light and generating a high output light signal, a light branching device 50 as a branching device for branching the light signal output from the light amplifier 10 into n light signals, optical switching sections $40_1$~$40_n$ as light shut-off devices provided between the respective branching ports of the light branching device 50 and output ports $20_1$~$20_n$ corresponding to these, abnormality judging sections $30_1$~$30_n$ as abnormality judging devices for detecting the light signals which have passed through the output ports $20_1$~$20_n$ and the optical switch sections $40_1$~$40_n$ towards the light branching device 50, to thereby judge the occurrence of an abnormality in the circuit (the transmission paths made for example of optical fiber) connected to the output ports $20_1$~$20_n$. Here the light signals sent to the respective subscribers from the light amplifying/branching apparatuses via the public circuit are made falling light signals, while the light signals sent to light amplifying/branching apparatuses from the respective subscribers via the public circuit are made rising light signals.

The light amplifier 10 amplifies the light signal sent from a pre-stage amplifying/branching apparatus, using for example an optical fiber amplifier or the like. Here the operation of the light amplifier 10 is adjusted so that ultimately the power of the light signals output from the respective output ports $20_1$~$20_n$ finally becomes a predetermined level (for example more than 10 dBm).

The ends of the optical fibers which connect to the respective subscribers are connected to the output ports $20_1$~$20_n$ with optical connectors or the like. Although not shown in FIG. 4, the not yet used output ports are fitted with terminators, or are left in the open condition.

As follows is a description of the construction corresponding to the output port $20_1$. The constructions corresponding to the other output ports $20_2$~$20_n$ are the same as that corresponding to the output port $20_1$, and hence description is omitted.

The abnormality judging section $30_1$, for example, comprises a light branching device $31_1$, a light receiving device (PD) $32_1$, an amplifier (AMP) $33_1$, and a discriminator (DET) $34_1$. Here, the light branching device $31_1$, the light receiving device $32_1$, and the amplifier $33_1$ function as a rising signal detecting section while the discriminator $34_1$ functions as a judging section.

The light branching device $31_1$ is here inserted between the optical switching section $40_1$ and the branching port of the light branching device 50, so that the rising light signal from the optical switching section $40_1$ towards the light branching device 50 is branched and sent to the light receiving device $32_1$. The light receiving device $32_1$ uses for example an photo-electric conversion element such as a photodiode to convert the rising signal branched by the light branching device $31_1$ into an electric signal and output this to the amplifier $33_1$. The amplifier $33_1$ is an electric amplifier which amplifies the electric signal from the light receiving device $32_1$ to a level at which discrimination processing by the discriminator $34_1$ is possible. The discriminator $34_1$ compares the output signal from the amplifier $33_1$ with a previously set reference signal REF to thereby judge if an abnormality has occurred in the circuit. Here, when the occurrence of an abnormality is judged, a control signal is output to the optical switching section $40_1$. The reference signal REF is set to correspond to the reception level of the rising light signal which is sent from the subscriber, in the case where the circuit connected to the output port $20_1$ is in a normal condition.

The optical switching section $40_1$ comprises an optical switch $41_1$ and an optical switch control device $42_1$. The optical switch $41_1$ has a contact point P1 for transmitting the light signal sent from the light amplifier 10 via the light branching devices 50, $31_1$, to the output port $20_1$, and a contact point P2 for transmitting the beforementioned light signal to a terminator. The optical switch control device $42_1$ controls the operation of the optical switch $41_1$. Here when the control signal from the abnormality judging section $30_1$ is received, the contact point for the optical switch $41_1$ is switched from P1 to P2. Furthermore, when a reset signal SWCONT is input from outside, the contact point of the optical switch $41_1$ is reset from P2 to P1. Consequently, the optical switch control device $42_1$ functions as a shut-off release section.

Next is a description of the operation of the optical amplifying/branching apparatus. Since the respective operations corresponding to the respective output ports $20_1 \sim 20_n$ are the same, only the operation corresponding to the output port $20_1$ is described here.

At first, in the case where the circuit connected to the output port $20_1$ is in a normal condition, the rising signal transmitted from the subscriber reaches as far as the optical amplifying/branching apparatus. The rising signal then passes through the output port $20_1$ and the optical switch $41_1$ and is branched by the light branching device $31_1$ of the abnormality judging section $30_1$. The branched rising signal is converted into an electric signal by the light receiving device $32_1$, and then amplified by the amplifier $33_1$ and sent to the discriminator $34_1$. With the discriminator $34_1$, since the level of the signal from the amplifier $33_1$ exceeds the level denoted by the reference signal REF, it is judged that the circuit connected to the output port $20_1$ is normal. Here, a control signal is not sent from the abnormality judging section $30_1$ to the optical switching section $40_1$. With the optical switching section $40_1$, since a control signal from the abnormality judging section $30_1$ is not sent to the optical switch control device $42_1$, the contact point of the optical switch $41_1$ is maintained in the P1 condition. As a result, the high output light signal which is amplified by the light amplifier 10 and branched by the light branching device 50 passes through the optical switch $41_1$ and the output port $20_1$ and is sent to the circuit where it is transmitted as far as the subscriber.

On the other hand, in the case where an abnormality such as disconnection of a connector or fracture of an optical fiber occurs in the circuit connected to the output port $20_1$, the rising light signal sent from the subscriber does not reach as far as the optical amplifying/branching apparatus. Therefore, a rising signal is not detected in the abnormality judging section $30_1$ so that the comparison results of the discriminator $34_1$ become lower than the level denoted by the reference signal REF. From this, an abnormality of the circuit is judged, and a control signal is sent from the discriminator $34_1$ to the optical switch control device $42_1$. On receipt of this control signal, the optical switch control device $42_1$ switches the contact point of the optical switch $41_1$ from P1 to P2. As a result, the high output light signal transmitted from the light amplifier 10 is sent to the terminator side by the optical switch $41_1$ so that there is no release from the output port $20_1$.

Consideration is now given to when the circuit is enlarged.

At first, in the condition where the output port is not yet used, then naturally a rising signal is not detected by the abnormality judging section $30_1$. Hence the contact point of the optical switch is on the terminator side. Consequently, there is no release of a high output light signal from the not yet used output port. Furthermore, at the time of circuit enlargement, after the additional circuit has been reliably connected to the not yet used port, a reset signal is sent to the optical switch control device $42_1$, thereby switching the contact point of the optical switch to P1 so that the high output light signal is sent to the additional circuit.

In this way, if an abnormality occurs in one circuit, the contact point of the optical switch corresponding to the output port to which that circuit is connected is switched to the terminator side. Hence release to the surroundings of the high output light signal from the open end or from the damaged point can be prevented. Moreover since the light amplifier 10 maintains the amplifying operation even when an abnormality occurs in the circuit, then high output light signals continue to be sent from the output ports of the normal circuits. Consequently the situation as with the conventional arrangement, where when an abnormality occurs in one circuit, the operation of the optical amplifier is limited and all of the circuits which receive the light signal from that optical amplifier are shut-off does not arise. This is the same as at the time of expansion of the circuit. Furthermore, fracture of an optical fiber can be reliably detected by judging the occurrence of an abnormality in the circuit, based on the rising signal sent from the subscriber. Hence the apparatus has improved safety.

Now the above description has been given in relation to a single light amplifying/branching apparatus provided on the last stage of the relay station shown in FIG. 3. However optical amplifying/branching apparatuses the same as this are multiply provided on the last stage of the relay station. Furthermore, not only with the last stage of the relay station but also the respective light amplifying/branching apparatuses arranged in multi stages, may be made the same as for this embodiment.

Next is a description of a second embodiment.

With the second embodiment, a description is given for the case where a rising light signal including discrimination information for the output port is sent from the subscriber to the light amplifying/branching apparatus. Here the case will be considered for where the discrimination information for the output port is denoted for example by the frequency of the rising light signal.

Figure 5:
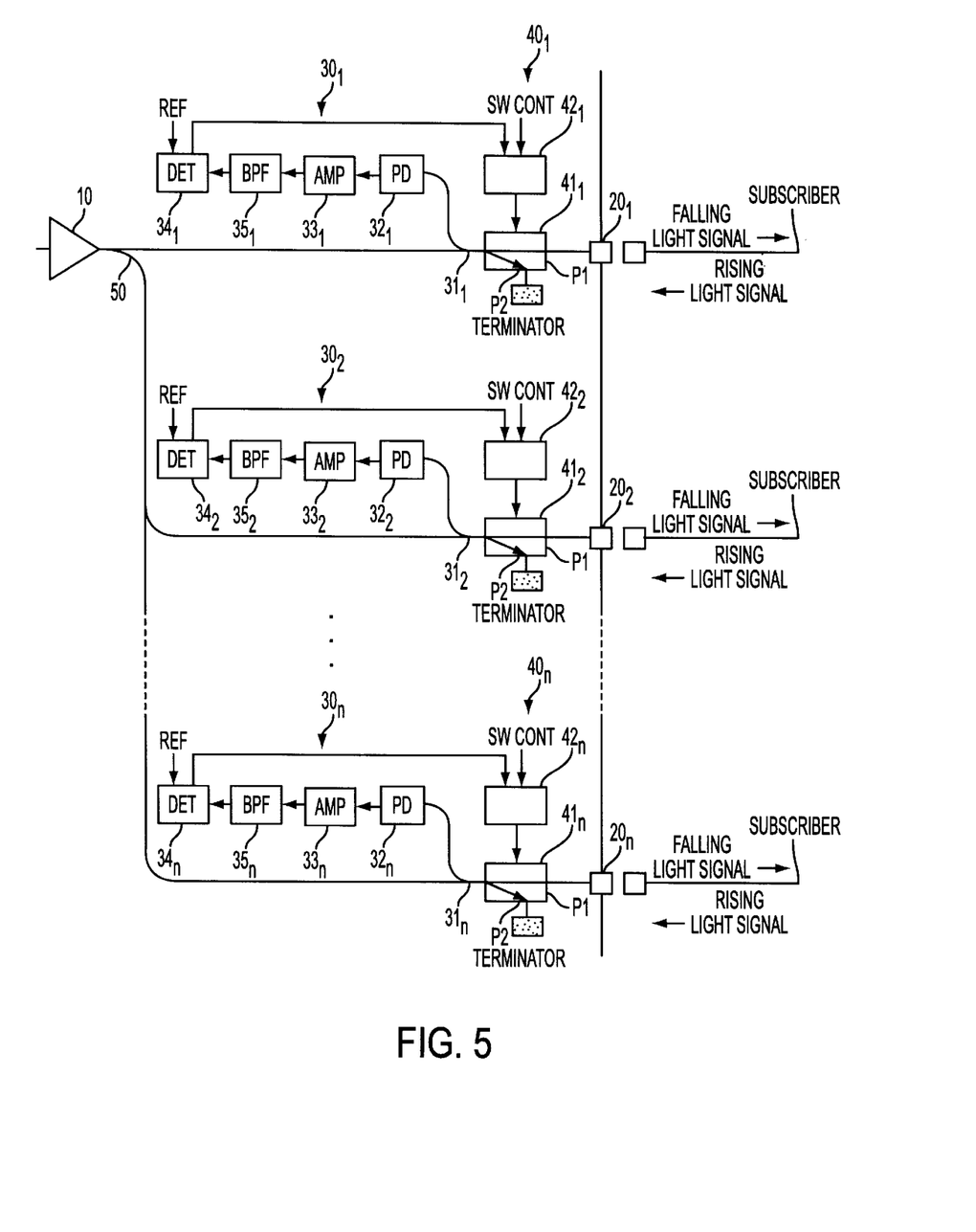
FIG. 5 a block diagram illustrating the construction of a second embodiment of the present invention.

FIG. 5 is a block diagram illustrating the construction of a light amplifying/branching apparatus of the second embodiment. Construction the same as for that of the first embodiment shown in FIG. 4 is appended with the same symbol, here and in the following.

In FIG. 5, the part where the construction of this embodiment differs from that of the first embodiment is that electric band pass filters (BPF) $35_1$~$35_n$ are provided between the amplifiers $33_1$~$33_n$ of the abnormality judging sections $30_1$~$30_n$ and the discriminators $34_1$~$34_n$. Other construction is the same as that of the first embodiment, and hence description is omitted.

The respective band pass filters $35_1$~$35_n$ have pass bands of which center frequencies respectively correspond to the frequencies of the rising light signals sent from the subscribers. The frequencies of the rising light signals are set so as to correspond to the respective output ports $20_1$~$20_n$. Consequently, the respective band pass filters $35_1$~$35_n$ function as discrimination information recognition sections.

With such a light amplifying/branching apparatus, among the light signals branched by the light branching devices $31_1$~$31_n$ of the respective abnormality judging sections $30_1$~$30_n$, only the rising light signals having frequencies within the pass band of the respective band pass filters $35_1$~$35_n$ are sent to the discriminators $34_1$~$34_n$. As a result, even in the case where the light signals branched by the light branching devices $31_1$~$31_n$ include noise light other than the rising light signal sent from the subscriber, only the rising light signal from the subscriber is reliably detected so that whether or not an abnormality has occurred in the circuit can be judged. Hence a light amplifying/branching apparatus with even better safety is provided.

Next is a description of a third embodiment.

With the third embodiment, as with the second embodiment, the rising light signal sent from the subscriber includes discrimination information for the output port. Here the case will be considered for where the discrimination information is denoted for example by the wavelength of the rising light signal.

Figure 6:
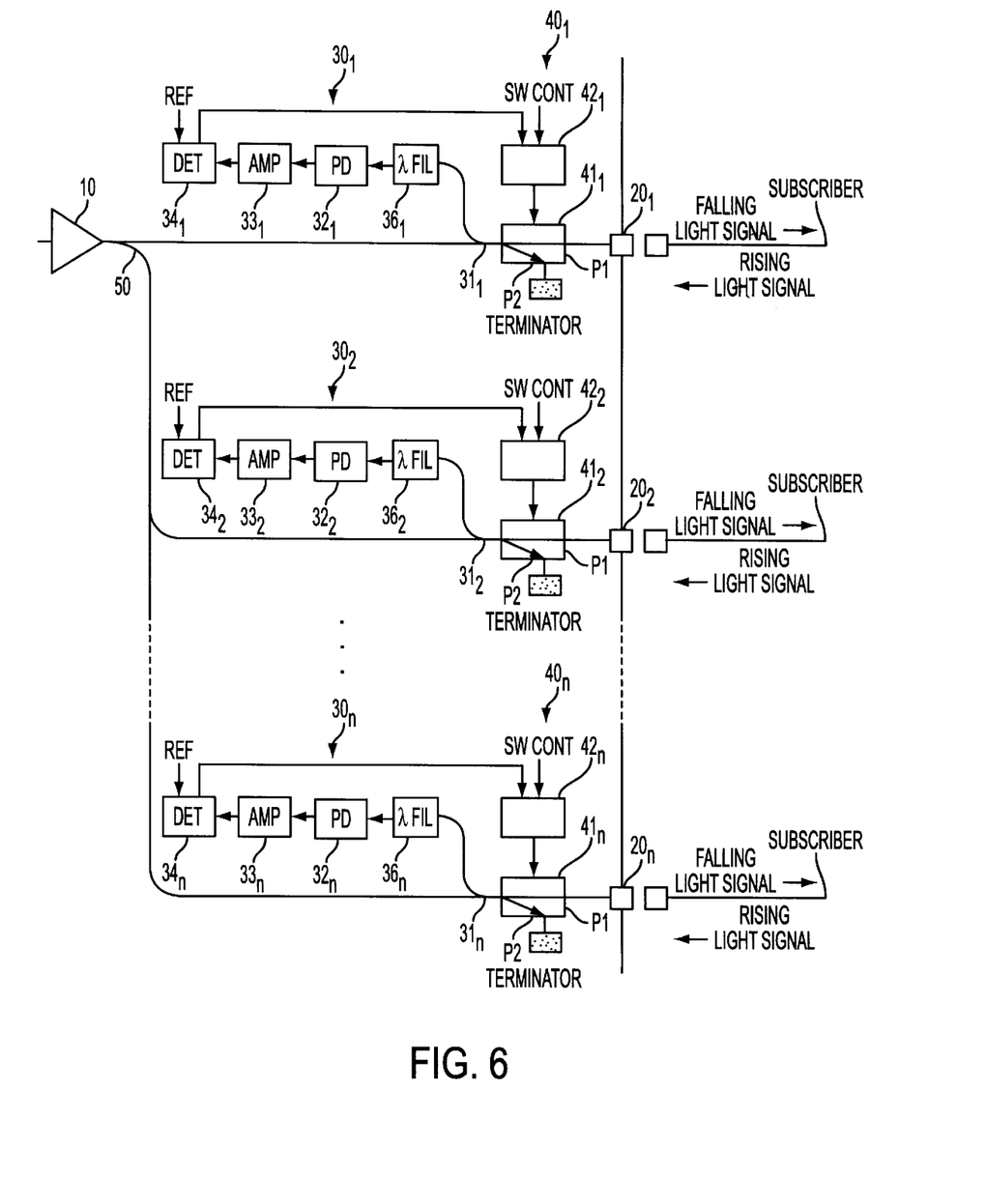
FIG. 6 is a block diagram illustrating the construction of a third embodiment of the present invention.

FIG. 6 is a block diagram illustrating the construction of a light amplifying/branching apparatus of the third embodiment.

In FIG. 6, the part where the construction of this embodiment differs from that of the first embodiment is that wavelength selection optical filters ($\lambda$FIL) $36_1$~$36_n$ are provided between the light branching devices $31_1$~$31_n$ of the abnormality judging sections $30_1$~$30_n$ and the light receiving devices $32_1$~$32_n$. Other construction is the same as that of the first embodiment, and hence description is omitted.

The respective wavelength selection optical filters $36_1$~$36_n$ have transmission wavelength bands respectively corresponding to the wavelengths of the rising light signals sent from the subscribers. The wavelengths of the rising light signals are set so as to correspond to the respective output ports $20_1$~$20_n$. Here, the wavelength selection optical filters $36_1$~$36_n$ function as discrimination information recognition sections.

With such a light amplifying/branching apparatus, among the light signals branched by the light branching devices $31_1$~$31_n$ of the respective abnormality judging sections $30_1$~$30_n$, only the rising light signals having wavelengths within the transmission wavelength band of the respective wavelength selection optical filters $36_1$~$36_n$ are sent on past the light receiving devices $32_1$~$32_n$. As a result, as with the case for the second embodiment, the rising light signal sent from the subscriber is reliably detected so that whether or not an abnormality has occurred in the circuit can be judged. Hence a light amplifying/branching apparatus with even better safety is provided.

Next is a description of a fourth embodiment.

With the fourth embodiment, a description is given for the case where respective rising signals sent from the subscribers to the respective output ports are batch processed in a single abnormality judgment section.

Figure 7:
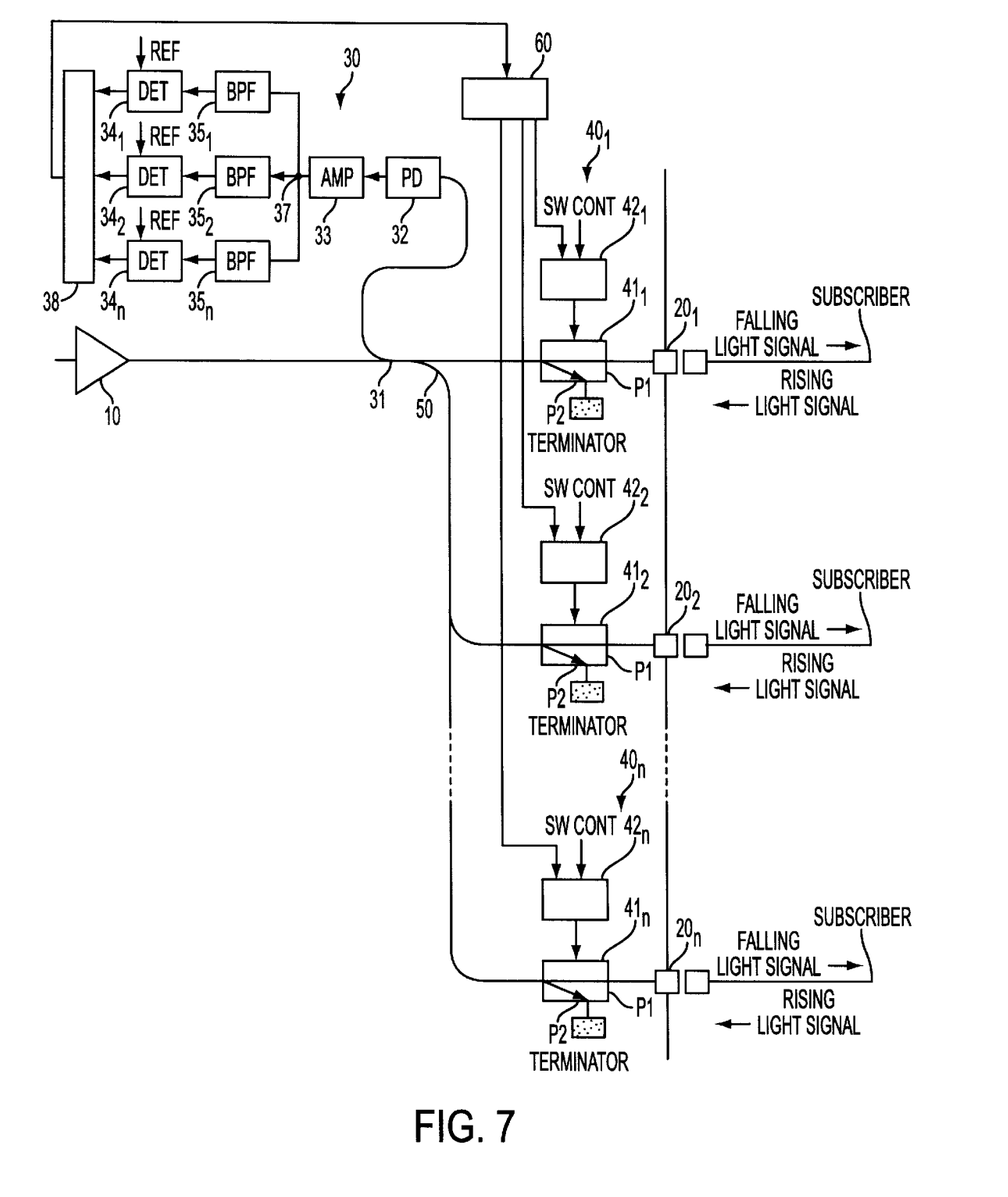
FIG. 7 is a block diagram illustrating the construction of a fourth embodiment of the present invention.

FIG. 7 is a block diagram illustrating the construction of a light amplifying/branching apparatus of the fourth embodiment.

In FIG. 7, the part where the construction of this embodiment differs from that of the second embodiment is that instead of providing abnormality judging sections $30_1$~$30_n$ for each output port $20_1$~$20_n$ in the second embodiment, only one abnormality judging section 30 is provided, and a selector 60 is provided which selects one of the optical switching sections $40_1$~$40_n$ which corresponds to the control signal output from the abnormality judgment section 30 and sends the control signal to this optical switching section. Other construction is the same as that of the second embodiment.

The abnormality judgment section 30 comprises for example, a light branching device 31, a light receiving device (PD) 32, an amplifier (AMP) 33, an electric branching device 37, band pass filters (BPF) $35_1$~$35_n$, discriminators (DET) $34_1$~$34_n$ and a control signal processor 38.

The light branching device 31 is here inserted between the light branching device 50 and the light amplifier 10, so that the respective rising light signals from the light branching device 50 towards the light amplifier 10 are branched and sent to the light receiving device 32. The light receiving device 32 batch receives the respective rising light signals branched by the light branching device 31 and converts these into electric signals. The amplifier 33 amplifies the electric signals from the light receiving device 32 to a level at which discrimination processing is possible. The electric branching device 37 branches the electric signal from the amplifier 33 into a number the same as the number of the output ports $20_1$~$20_n$ and outputs these. The band pass filters $35_1$~$35_n$ and the discriminators $34_1$~$34_n$ are the same as those of the second embodiment. The control signal processor 38 affixes to the control signals output from the respective discriminators $34_1$~$34_n$, for example address numbers or the like for the respective optical switching sections for indicating to which optical switching section $40_1$~$40_n$ the control signals correspond.

With the light amplifying/branching apparatus, after the respective rising light signals sent from the subscribers to the respective output ports $20_1$~$20_n$ pass through the respective optical switching sections $40_1$~$40_n$, the light branching device 50 passes these in the reverse direction from the branch port side to thereby combine these into a single light signal. This combined light signal is branched by the light branching device 31 of the abnormality judgment section 30 and batch converted into electric signals in the light receiving device 32, and then amplified by the amplifier 33. The output signal from the amplifier 33 is again branched into n branches by the electric branching device 37, and input to the respective band pass filters $35_1$~$35_n$ The respective band pass filters $35_1$~$35_n$ extract the frequency components corresponding to the respective pass bands from the sent signals and send these to the respective discriminators $34_1$~$34_n$ In the respective discriminators $34_1$~$34_n$, the signals which have passed through the band pass filters $35_1$~$35_n$ are compared with reference signals REF, and if the occurrence of an abnormality of the circuit is judged, a control signal is sent to the control signal processor 38. The control signal processor 38, affixes the address number of the corresponding optical switch section to the control signals from the respective discriminators $34_1$~$34_n$, and sends these to the selector 60. The selector 60 reads the address number from the control signals from the abnormality judgment section 30 and sends the control signal to the appropriate optical switch section. The optical switch section to which this control signal is sent then switches the contact point of the optical switch by means of the optical switch control signal.

In this way, with the fourth embodiment, even though the rising signals sent to the respective output ports $20_1$~$20_n$ are batch detected in the abnormality judgment section 30 to judge the occurrence of an abnormality in the respective circuits, an effect the same as for the above second embodiment can be obtained. Moreover, by batch processing the rising light signals, the apparatus construction can be simplified. In particular this is effective for the case where there is a large number of output ports.

Figure 8:
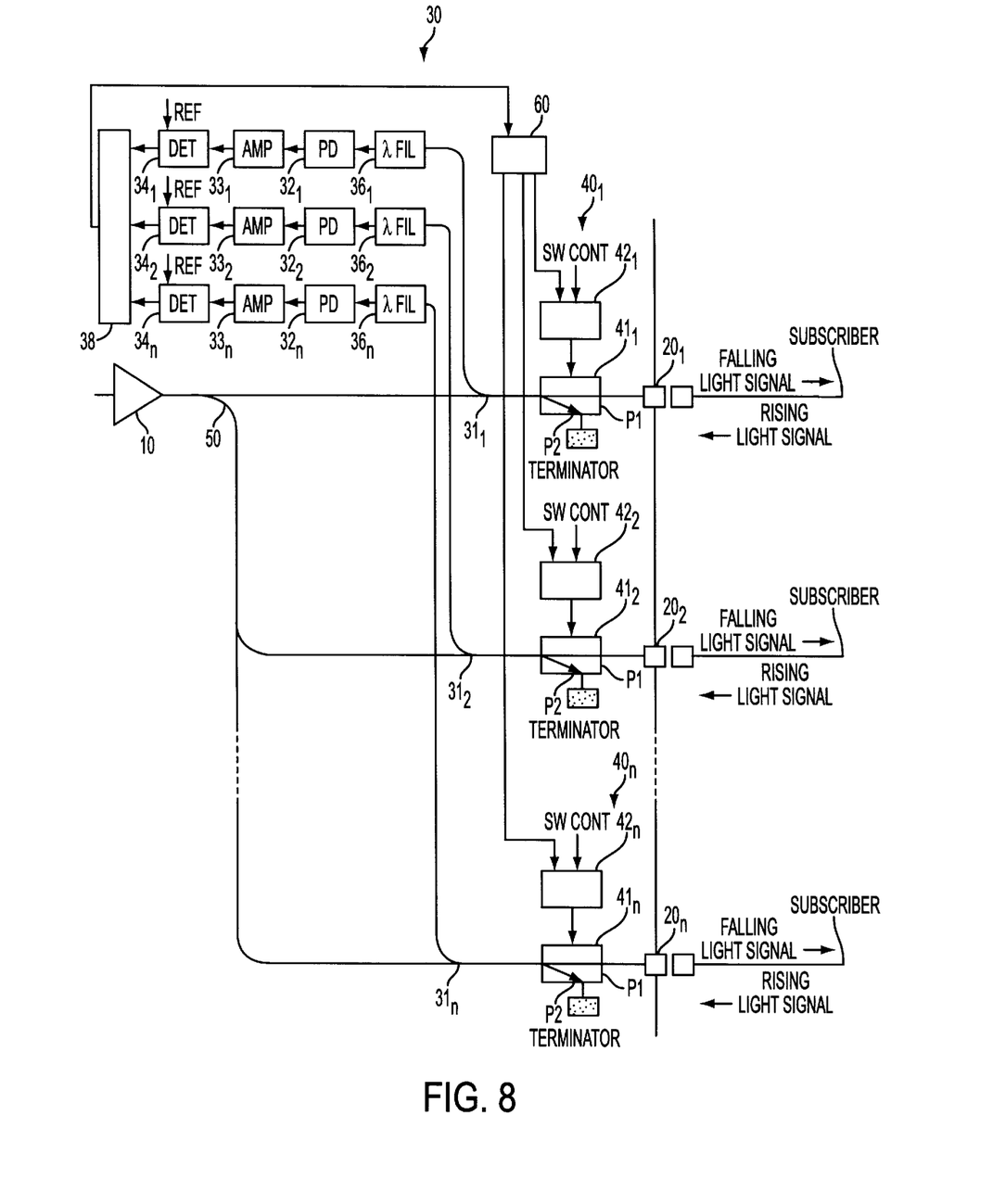
FIG. 8 is a block diagram related to the fourth embodiment of FIG. 7, illustrating the construction for the case where discrimination information of an output port is expressed by the wavelength of a rising light signal.

With the fourth embodiment, the case for where the discrimination information for the output port is denoted by the frequency of the rising light signal has been described. However a construction where the rising light signal is batch processed is also possible for the case as with the third embodiment, where the discrimination information for the output port is denoted by the wavelength of the rising light signal. A construction example for this case is shown in FIG. 8.

Next is a description of a fifth embodiment.

With the fifth embodiment, the case is described for where a function is provided which automatically switches the contact point of the optical switch to the output port side, in the case where after detecting the occurrence of an abnormality in the circuit and switching the contact points of the optical switch to the terminator side, the circuit is restored to the normal condition. Here for example, the provision of such a function to the second embodiment is considered.

Figure 9:
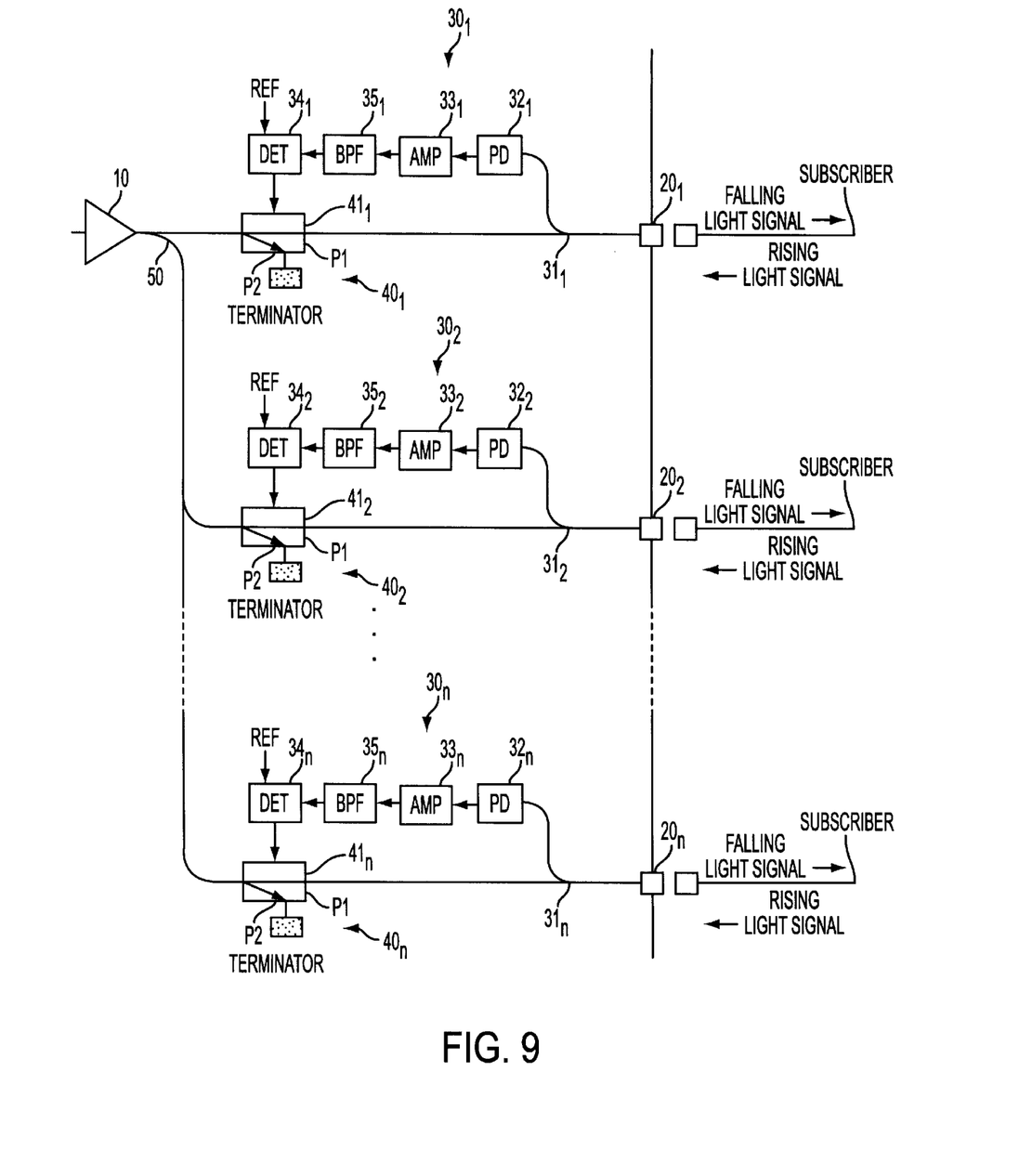
FIG. 9 is a block diagram illustrating the construction of a fifth embodiment of the present invention.

FIG. 9 is a block diagram illustrating the construction of an amplifying/branching apparatus of the fifth embodiment.

In FIG. 9, the part where the construction of this embodiment differs from that of the second embodiment is that the light branching devices $31_1$~$31_n$ of the respective abnormality judging sections $30_1$~$30_n$ are inserted between the output ports $20_1$~$20_n$ and the optical switching sections $40_1$~$40_n$, and that the optical switching sections $40_1$~$40_n$ only have optical switches $41_1$~$41_n$ and the optical switch control devices $42_1$~$42_n$ are omitted. Other construction is the same as that of the second embodiment.

With the optical switches $41_1$~$41_n$, when a circuit abnormality occurs, the control signal output from the abnormality judging sections $30_1$~$30_n$ is input directly. The optical switches $41_1$~$41_n$ operate such that if there is no control signal input, the contact points are maintained on the output port side (P1) while if a control signal is input, the contact points are maintained on the terminator side (P2).

By having such a construction, then when an abnormality occurs in the circuit, for example, a rising light signal fails to be detected in the corresponding abnormality judging section $30_1$, a control signal is sent from the abnormality judging section $30_1$ to the optical switch $41_1$, and the contact points of the optical switch $41_1$ switch from P1 to P2. Then when the circuit in which the abnormality occurred is restored to the normal condition, the rising light signal from the subscriber reaches as far as the output port $20_1$. As a result, the rising light signal is detected by the abnormality judgment section $30_1$ and the control signal from the abnormality judgment section $30_1$ to the optical switch $41_1$ is cancelled. With the optical switch $41_1$ for which input of the control signal has ceased, the contact points are switched from P2 to P1 so that the high output light signal is again sent from the output port $20_1$ to the circuit.

Also at the time of circuit enlargement, when the additional circuit is connected to the not yet used output port and transmission of the rising light signal from a subscriber is initiated, then similarly to at the time of restoration as mentioned above, the contact points of the optical switch are switched from P2 to P1, so that the high output light signal is sent to the additional circuit.

In this way with this embodiment, at the time of circuit restoration or enlargement, then without sending a reset signal or the like to the optical switch, the contact points of the optical switch are automatically switched so that the high output light signal is sent to the circuit. Therefore an improvement in the convenience of the light amplifying/branching apparatus can be achieved, and also the construction of the apparatus can be further simplified.

Figure 10:
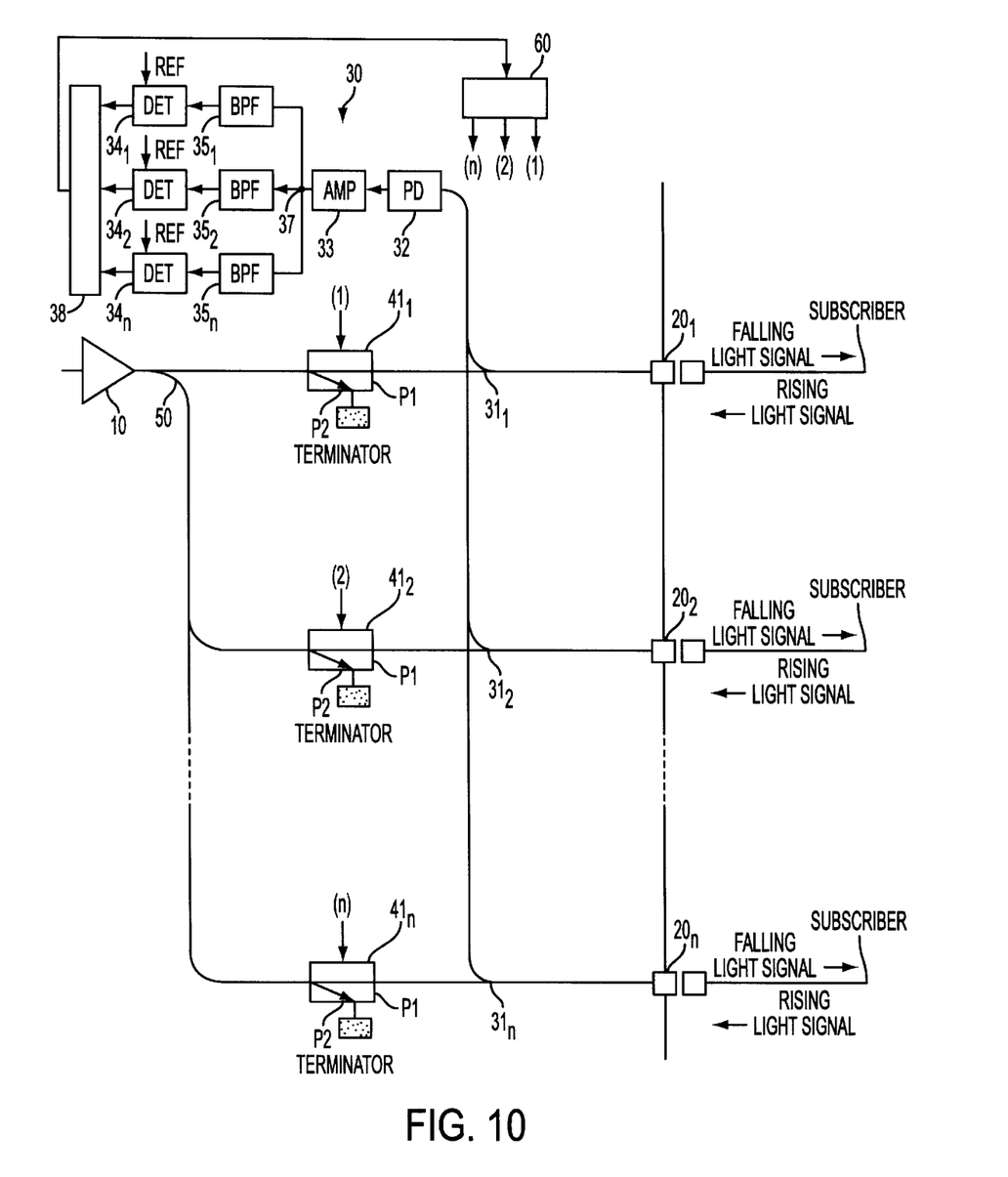
FIG. 10 is a diagram illustrating another construction example related to the fifth embodiment of FIG. 9.
Figure 11:
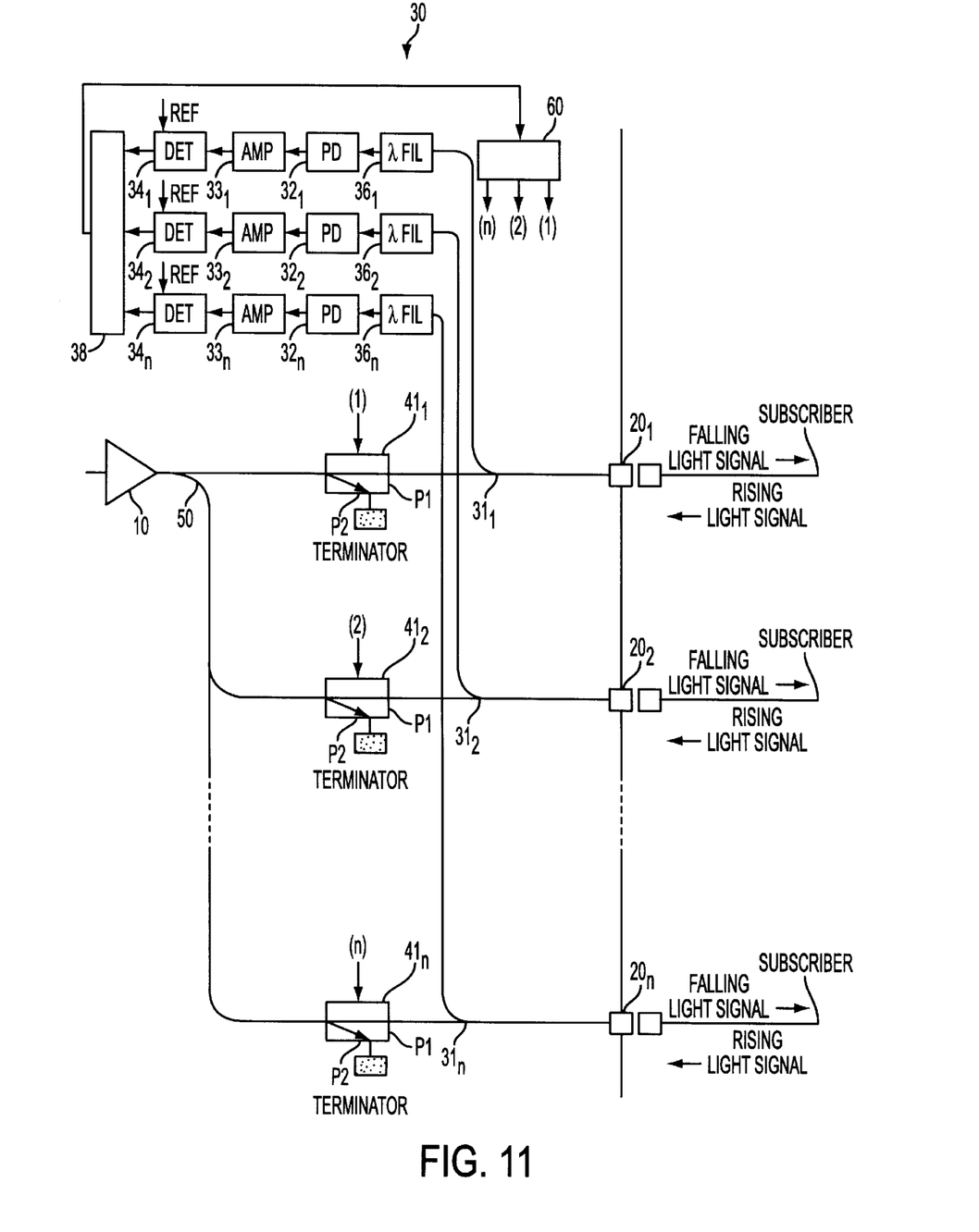
FIG. 11 is a diagram illustrating a separate construction related to the fifth embodiment of FIG. 9.

Now with the fifth embodiment, consideration has been given to providing a function for automatically switching the contact points of the optical switch, for the case of the second embodiment. However the invention is not limited to this and a function similar to the above can also be provided for the case of the other embodiments. As one example, FIGS. 10 and 11 show an example applied to the construction shown in the FIG. 7 and FIG. 8. In both of these construction examples, the abovementioned function can be obtained basically by inserting the light branching device of the abnormality judgment section between the output port and the optical switch.

Next is a description of a sixth embodiment.

With the sixth embodiment, the case is described for where the function for automatically switching the contact point of the optical switch at the time of circuit restoration or enlargement is realized by another construction different from the construction of the fifth embodiment. Here for example, the provision of such a function to the fourth embodiment is considered.

Figure 12:
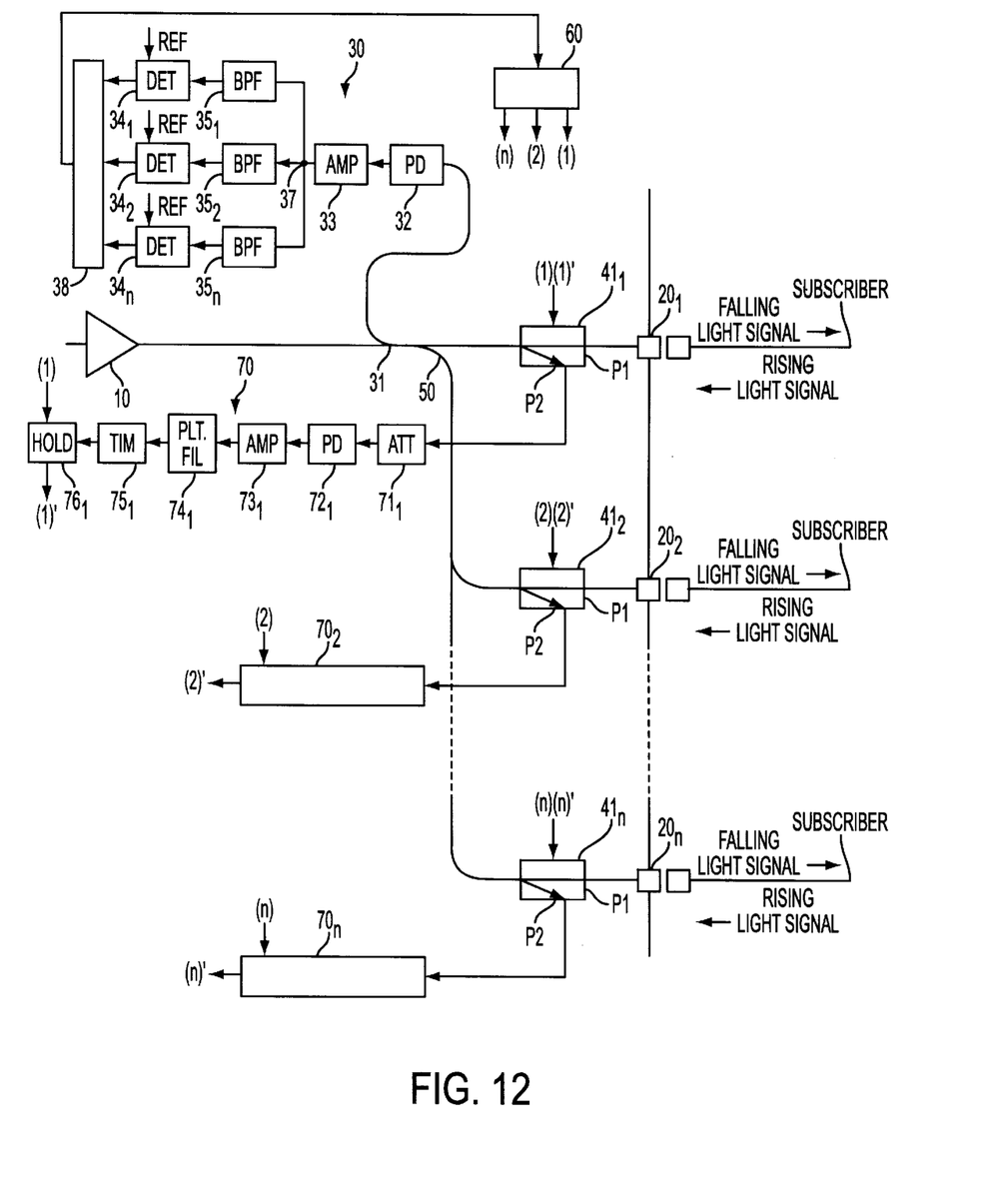
FIG. 12 is a block diagram illustrating the construction of a sixth embodiment of the present invention.

FIG. 12 is a block diagram illustrating the construction of an amplifying/branching apparatus of the sixth embodiment. In FIG. 12, only the construction corresponding to the output port $20_1$ is specifically shown. The construction corresponding to the other output ports $20_2$~$20_n$ is the same as for the case of the output port $20_1$.

In FIG. 12, with the construction of this embodiment, shut-off release sections $70_1$~$70_n$ corresponding to the respective output ports $20_1$~$20_n$ are added to the construction of the fourth embodiment. Furthermore the respective optical switching sections $40_1$~$40_n$ only have the optical switches $41_1$~$41_n$, and instead of connecting the terminators, the input terminals of the shut-off release sections $70_1$~$70_n$ are connected to the contact points P2 of the optical switches $41_1$~$41_n$. Furthermore, here the respective discriminators $34_1$~$34_n$ of the abnormality judgment section 30 output an abnormality control signal when the occurrence of an abnormality of the circuit is judged, and output a normal control signal when a normal condition of the circuit is judged.

The shut-off release section $70_1$ comprises for example; a light attenuator (ATT) $71_1$ for attenuating the light signal from the contact point P2 of the optical switch $41_1$, a light receiving device (PD) $72_1$ for converting the light signal from the light attenuator $71_1$ into an electric signal, an amplifier (AMP) $73_1$ for amplifying the signal from the light receiving device $72_1$, a filter (PLT.FIL) $74_1$ for extracting a specific frequency component from the output signal from the amplifier $73_1$, a timer circuit (TIM) $75_1$ for receiving a signal from the filter $74_1$ to start operation, and a hold circuit $76_1$ into which is input the output signal from the timer circuit $75_1$ and a normal control signal from the abnormality judgment section 30.

The light attenuator $71_1$ is provided to attenuate the high output light signal to a light power level which can be processed by the post-stage respective sections. The filter $74_1$, here for example, has a pass band which will pass a pilot signal included in the input light signal. The timer circuit $75_1$ outputs a timer signal for generating a short pulse at a constant period when a pilot signal extracted by the filter $74_1$ is input. The hold circuit $76_1$ outputs the timer signal from the timer circuit $75_1$ to the optical switch $41_1$ when there is no input of a normal control signal, and stops the output of the timer signal when a normal control signal is input.

With a light amplifying/branching apparatus of such construction, when the occurrence of an abnormality of a circuit is judged by the abnormality judgment section 30, then in a similar manner to the case of the fourth embodiment, an abnormality control signal is sent from the abnormality judgment section 30 to the selector 60, and the contact points of the optical switch corresponding to this abnormality control signal are switched from P1 to P2. For example, in the case where the contact points of the optical switch $41_1$ are switched to P2, then the high output light signal sent from the light amplifier 10 is sent from the contact point P2 of the optical switch $41_1$ to the shut-off release section $70_1$.

With the shut-off release section $70_1$, the high output light signal is attenuated by the light attenuator $71_1$, converted to an electric signal by the light receiving device $72_1$, and amplified by the amplifier $73_1$, after which the pilot signal is extracted by the filter $74_1$. Then, when the extracted pilot signal is input to the timer circuit $75_1$, a timer signal is output to the hold circuit $76_1$. Since the hold circuit $76_1$ at this time has no input of a normal control signal from the abnormality judgment section 30, the timer signal is sent to the optical switch $41_1$. The optical switch $41_1$ which receives this timer signal switches the contact point according to the timer signal, so that the contact point is switched from P2 to P1 for a short time at a constant period.

When the circuit is restored to the normal condition, the rising light signal from the subscriber reaches as far as the output port $20_1$ and the optical switch $41_1$. At this time since with the optical switch $41_1$, the contact point is periodically switched, then the rising light signal passes through the optical switch $41_1$ and is detected by the abnormality judgment section 30. As a result, the abnormality control signal output from the abnormality judgment section 30 is switched to the normal control signal. When this normal control signal is input to the hold circuit $76_1$, the output of the timer signal to the optical switch $41_1$ is stopped, and the contact point of the optical switch $41_1$ is held in the P1 condition so that the circuit is automatically restored. Moreover, at the time of circuit enlargement, when in a similar manner to the above the circuit to be added is connected normally, the high output light signal is automatically sent to the circuit.

With such an arrangement for the present embodiment, then as with the case of the fifth embodiment, at the time of circuit restoration or at the time of enlargement, the high output light signal is automatically sent to the circuit. Therefore an improvement in the convenience of the light amplifying/branching apparatus can be achieved.

Now with the sixth embodiment, consideration has been given to providing a function for automatically switching the contact point of the optical switch for the case of the fourth embodiment (FIG. 7). However the invention is not limited to this and a function similar to the above can also be provided for any of embodiments 1 through 3. Moreover, the construction has been such that the shut-off release section extracts the pilot signal included in the light signal and initiates output of the timer signal. However, the signal for indicating initiation of the timer signal is not limited to a pilot signal, and a suitable signal which can reliably detect the switching of the contact point of the optical switch to P2 can be used.

Moreover, with the abovementioned first through sixth embodiments, the light signal sent from the subscriber is used as the rising signal. However the invention is not limited to this, and for example, an application where an electric signal sent from the subscriber as shown in FIG. 2, or reflected light or the like from the opened end is used as the rising signal is possible. However, when the reflected light is made the rising signal, there is still the conventional problem that it is difficult to detect the reflected light due to the damage location or damage condition of the optical fiber. However, with a light amplifying/branching apparatus used pre-stage or mid-stage in a light amplifying/branching apparatus of multi-stage construction in a relay station, making the reflected light the rising signal is effective.

What I claimed is:

1. A method comprising:

generating a light signal;

amplifying the light signal to a higher output light power;

branching the amplified light signal via first and second branch ports into first and second amplified light signals, respectively, the first amplified light signal being sent to a first transmission path through a first output port connected to an end of the first transmission path, the second amplified light signal being sent to a second transmission path through a second output port connected to an end of the second transmission path;

judging if an abnormality has occurred in the transmission path, based on a rising signal which passes through said first output port in a direction opposite the first amplified light signal, and judging if an abnormality has occurred in the second transmission path based on a rising signal which passes through the second output port in a direction opposite to the second amplified light signal; and shutting off the first amplified light signal if said judging judges that an abnormality has occurred in the first transmission path, and shutting off the second amplified light signal if said judging judges that an abnormality has occurred in the second transmission path.

2. An apparatus comprising:

a light signal generating device generating a light signal;

an amplifier amplifying the light signal to a higher output light power;

a branching device branching the amplified light signal via first and second branch ports into first and second amplified light signals, respectively, the first amplified light signal being sent to a first transmission path through a first output port connected to an end of the first transmission path, the second amplified light signal being sent to a second transmission path through a second output port connected to an end of the second transmission path;

an abnormality judgment device judging if an abnormality has occurred the first transmission path based on a rising signal which passes through the first output port in a direction opposite to the first amplified light signal, and judging if an abnormality has occurred the second transmission path based on a rising signal which passes through the second output port in a direction opposite to the second amplified light signal; and a light shut-off device shutting off the first amplified light signal if the abnormality judgement device judges that an abnormality has occurred in the first transmission path, and shutting off the second amplified light signal if the abnormality judgement device judges that an abnormality has occurred in the second transmission path.

3. An apparatus according to claim 2, wherein said respective rising signals include discrimination information corresponding to said first and second output ports, and said abnormality judgment device has a discrimination information recognition section for recognizing said discrimination information included in the rising signal, and whether or not an abnormality has occurred in the transmission path is judged by said judgment section with respect to the output port corresponding to the discrimination information recognized by said discrimination information recognition section.

4. An apparatus according to claim 3, wherein said abnormality judgment device incorporates a rising signal detection section for batch detection of the respective rising signals which have passed through said respective output ports.

5. An apparatus according to claim 2, wherein said abnormality judgment device detects the rising signal on the light signal generating device side of said light shut-off device, and said light shut-off device includes a shut-off release section for releasing the shut-off condition in response to a reset signal from outside.

6. An apparatus according to claim 2, wherein said abnormality judgment device detects the rising signal on said light signal generating device side of said light shutoff device, and said light shut-off device includes a shut-off release section for periodically releasing a shut-off condition simultaneous with a start of this shut-off condition.

7. An apparatus according to claim 2, wherein said abnormality judgment device detects the rising signal on said output port side of said light shut-off device.

8. An apparatus according to claim 2, further comprising:

an enclosure which houses said light signal generating device, said amplifier, said abnormality judgment device, and said light shut-off device.

* * * * *